_United States Patent Office_

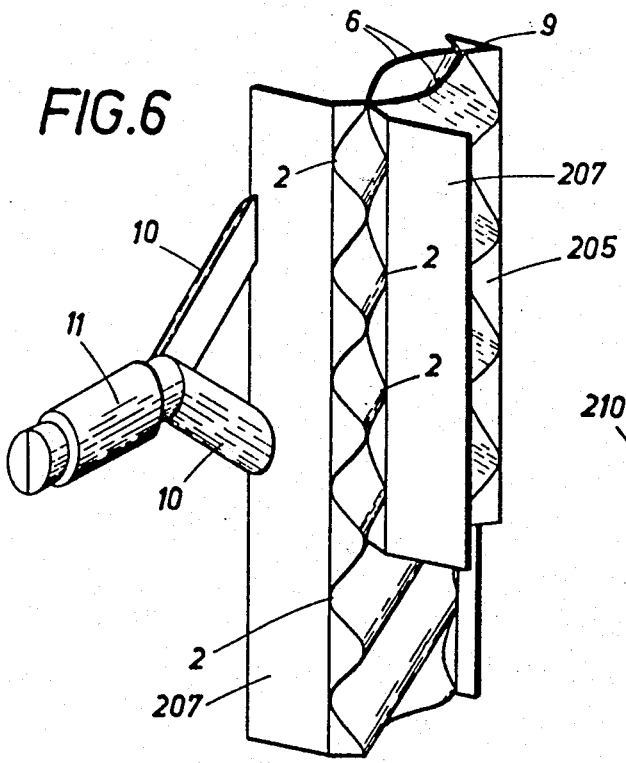
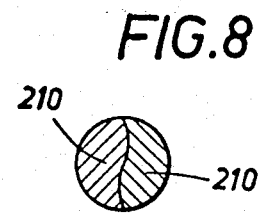
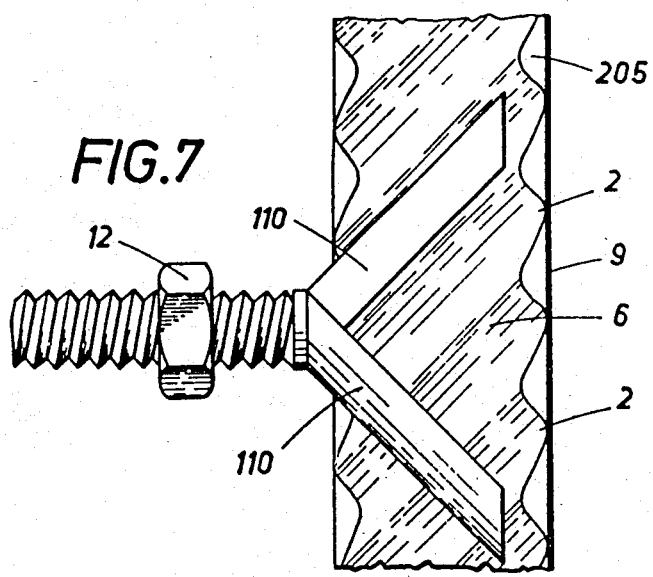

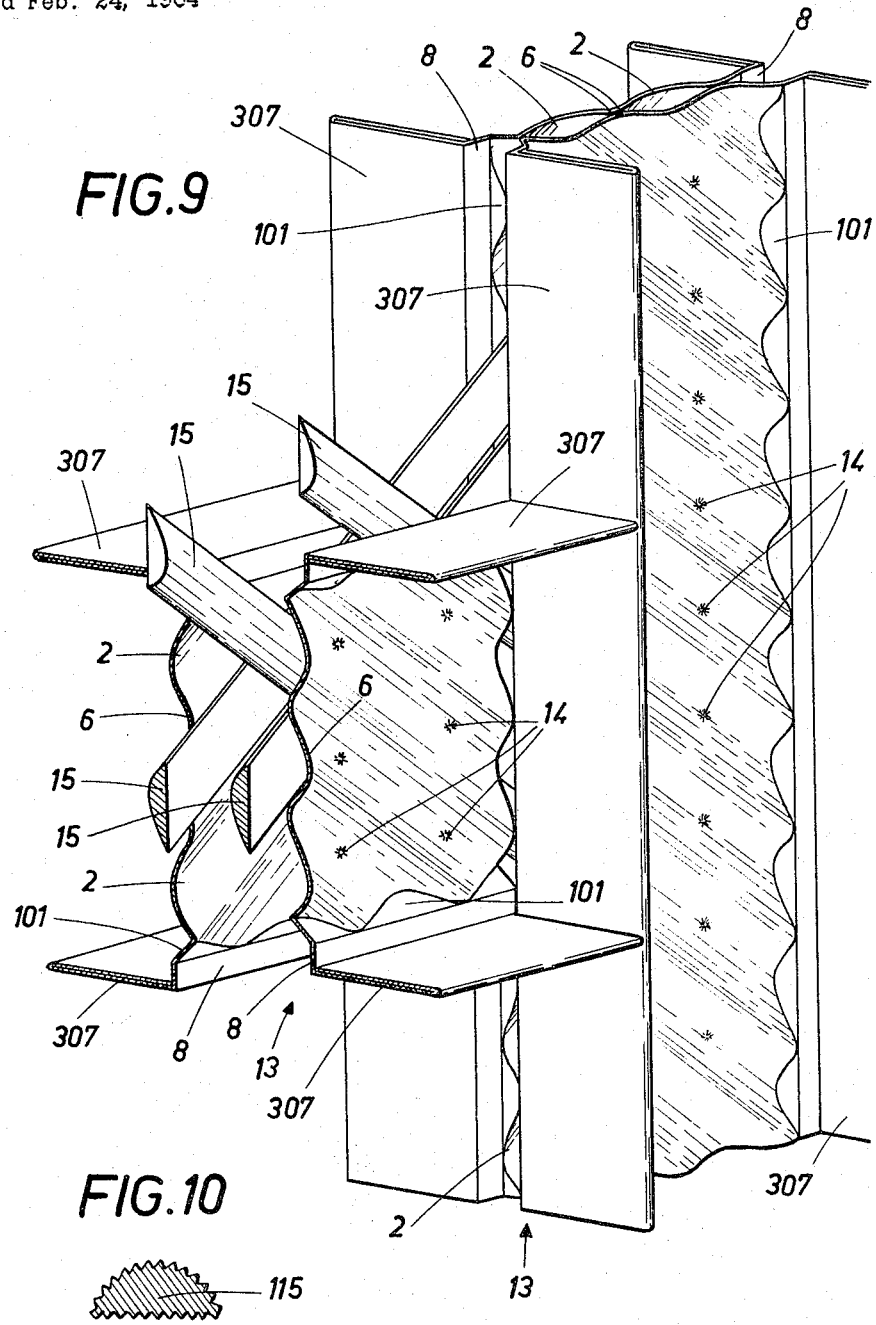

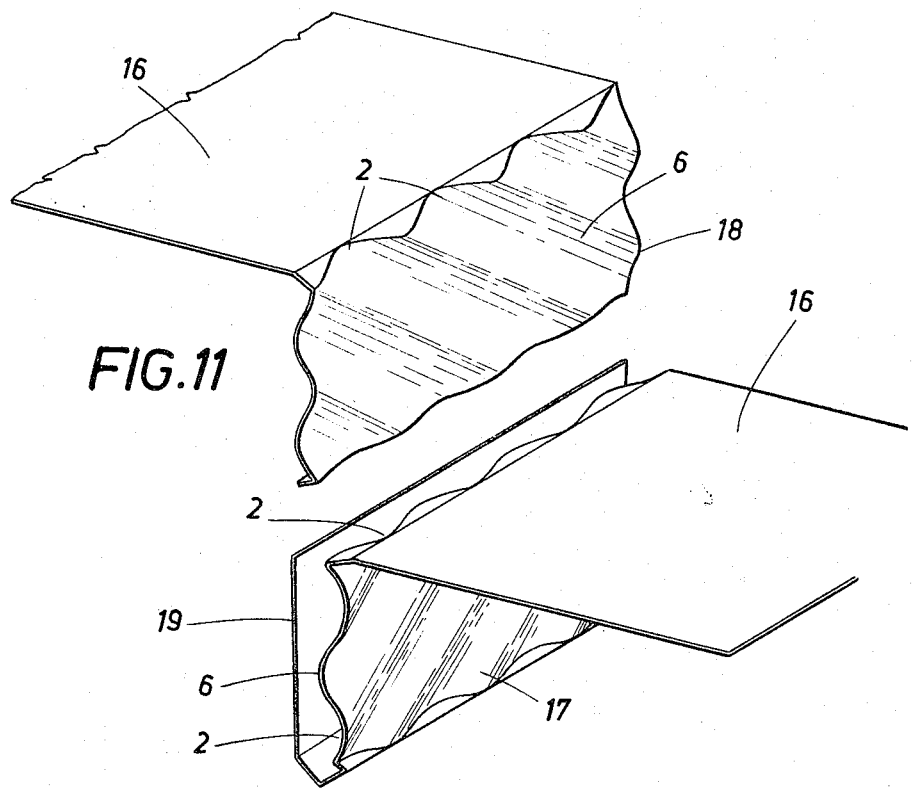
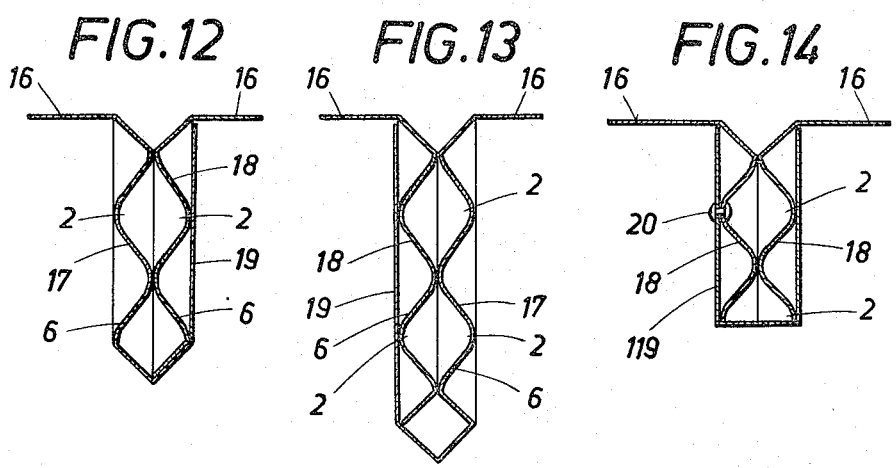

3,301,582
Patented Jan. 31, 1967

3,301,582
STRUCTURAL JOINT AND STRUCTURAL ELEMENTS
Josef Linecker, Rosengasse 5, Mattighofen, Austria
Filed Feb. 24, 1964, Ser. No. 346,687
Claims priority, application Austria, Feb. 25, 1963,
A 1,429/63
7 Claims. (Cl. 287—189.36)

This invention relates to structural elements, and to joints between structural elements.

The structural elements of the invention have elongated surfaces which confront or contact each other and are formed with a multiplicity of elongated grooves which are obliquely inclined to the longitudinal direction of the surface. The grooves of one surface cross those in the other surface and the space between the surfaces is filled with a unitary solid body of an initially fluid locking compound and/or connecting or anchoring bars which are fittingly inserted into the recesses.

The invention will be explained in greater detail with reference to the accompanying drawings, in which several embodiments of the invention are shown by way of example.

FIGS. 1 to 3, respectively, are a perspective view, a top plan view and a sectional view taken on line III—III of FIG. 2 of a strip member for use in the manufacture of a beamlike structural element.

FIG. 6 is a perspective view showing a similar structural element serving as a standard and provided with an anchoring bar which is composed of two component bars.

FIG. 7 is an elevational sectional view of the structural element of FIG. 6 with an inserted anchoring bar of different type.

FIG. 8 is a transverse sectional view showing another modification of an anchoring bar.

FIG. 9 is a perspective view showing a joint between vertical and horizontal beams.

FIG. 10 is is a transverse sectional view showing a modification of the connecting bar.

FIG. 11 is a perspective view illustrating the joint between two sheetlike structural elements before they are fitted together.

FIGS. 12 to 14 are transverse sectional views showing modifications of such a joint.

Figure 1:
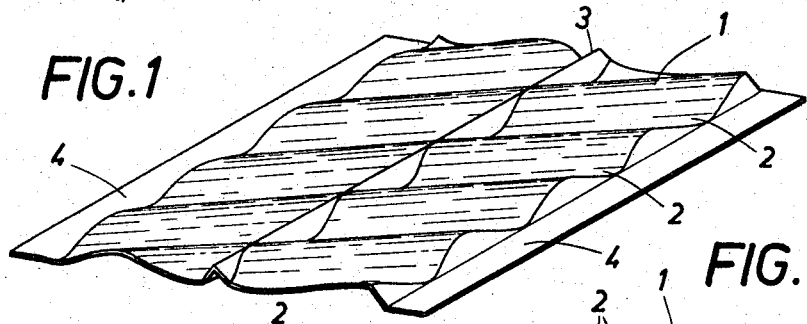
Figure 2:
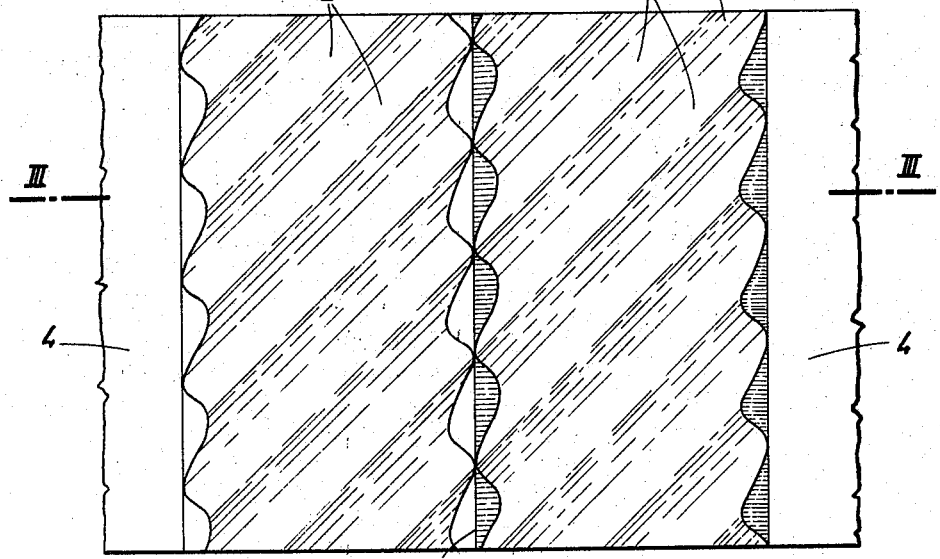
Figure 3:
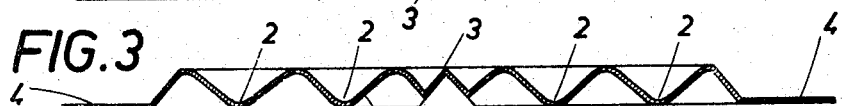
Figure 4:
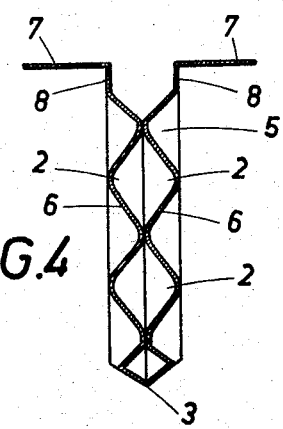
FIG. 4 is a transverse sectional view showing a structural element obtained by bending such a strip member.

According to FIGS. 1 to 3, a strip member 1 of sheet metal or plastics material is corrugated obliquely to the longitudinal direction of the strip, the ribs of the corrugations being separated by grooves 2. The corrugations are interrupted in the middle by a straight, folded edge 3 and merge into flat longitudinal edge strips 4. This metal strip member may be bent at the folded edge 3 to form a deep channel beam 5, such as is shown in FIG. 4. The beam 5 has two confronting inner surfaces 6, which contact each other and have grooves 2 obliquely inclined to the longitudinal direction of the surfaces. The grooves of one surface cross those of the other surface and are inclined at an angle of 45° relative to the longitudinal direction of the strip member. The two halves of the beam 5 are connected by spot welding at the crossing points of the ribs disposed between the grooves 2. The longitudinal edge strips 4 of the sheet metal strip member 1 are bent so as to form flanges 7, which do not directly adjoin the corrugated portion so that the surfaces 6 have flat edge strips 8. This results in the formation of a smooth-walled groove, which may facilitate the insertion of further structural elements. The edge strips 8 are spaced farther apart than the bottoms of the grooves, so that an exactly identical beam can be inserted into the groove.

Figure 5:
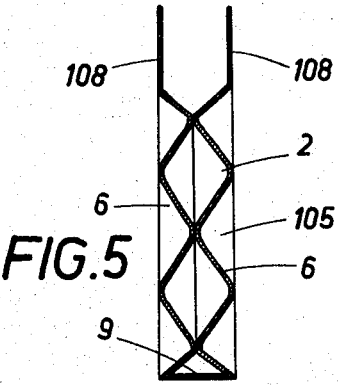
FIG. 5 is also a transverse sectional view showing another embodiment of such a structural element.

The beam 105 shown in FIG. 5 differs from the beam 5 only in that the two surfaces 6 are not connected by a straight, folded edge 3 but by a plane web 9. Besides, the edge strips 108 are not bent to form flanges.

FIGS. 6 and 7 show a beam element 205, which is quite similar to the structural element 5 or 105 but in which the surfaces 6 are narrow and lack flat edge strips, whereas flanges 207 are provided, which directly adjoin the corrugated portion. Such a beam element may be used as a standard for shelves or in a scaffold. For connection to other structural elements, anchoring bars 10 or 110 or 210 (FIG. 8) are inserted into the grooves 2 of the coacting surfaces 6. These bars conform to the cross-section of the recesses and have freely projecting ends. The ends of two bars inserted into respective recesses 2 which are offset at right angles, are bent so as to be parallel, a sleeve 11 is fitted over them so that it is not possible to pull the anchoring bars 10 or 110 out of the beam element 205. The bars 110 (FIG. 7) are provided with screw threads by a nut 12 for locking the bars. The anchoring bars 210 shown in FIG. 8 have conformingly engaged longitudinal faces of undular cross section so that the bars are held against a relative displacement transversely to their common axis.

According to FIG. 9, I-beams 13 each consist of two strip members 101 of sheet metal or plastic. These strip members form corrugated surfaces 6 having grooves 2 and are connected at the contact points 14 by spot welding. The corrugated portions are adjoined by plane edge strips 8, and the latter are adjoined by folded flanges 308. The web of the beam 13 has high strength or stiffness because of the corrugations of the coacting surfaces.

Two beams 13 meet at right angles and are connected by bars 15 or 115, which each extend in the recesses of both beams. Two groups of parallel bars cross each other. This joint can be separated only by removing bars. The connecting bars 15 and 115 may also provide a reliable connection between abutting, longitudinally aligned beams in an obvious manner. The bars 115 shown in FIG. 10 are provided with longitudinal grooves and fins. If they are used in the joint of FIG. 9, the joint can be separated only by pulling first the bar which has been inserted last and by successively pulling the bars in a sequence which is opposite to the sequence during insertion. An adhesive may be introduced into the grooves of the bars 115.

The beams 13 are suitable for the erection of frame structures above ground, such as partitions.

FIGS. 11 to 14 show the application of the invention to the connection of sheetlike structural elements such as metal plates 16. Angularly offset strip portions 17, 18 of the plates 16 have corrugated surfaces 6 having obliquely inclined grooves 2. As shown in FIGS. 11 to 13, the strip portion 17 forms a deep and narrow channel with an edge section 19 of the same plate 16. The channel accommodates the strip portion 18 of the second plate 16 and acts like a clamp. A separate deep channel section 119 may be provided, which is secured by rivets 20 or the like to one edge strip 18 (FIG. 14). It will be understood that the fitting of the edge strips 17, 18 into the channel section 19 or 119 does not provide a non-separable joint between the elements 16 until the space between the surfaces 6 is filled with a liquid compound which is then permitted to solidify and whose crossing barlike portions prevent any relative displacement of the structural elements.

Figure 15:
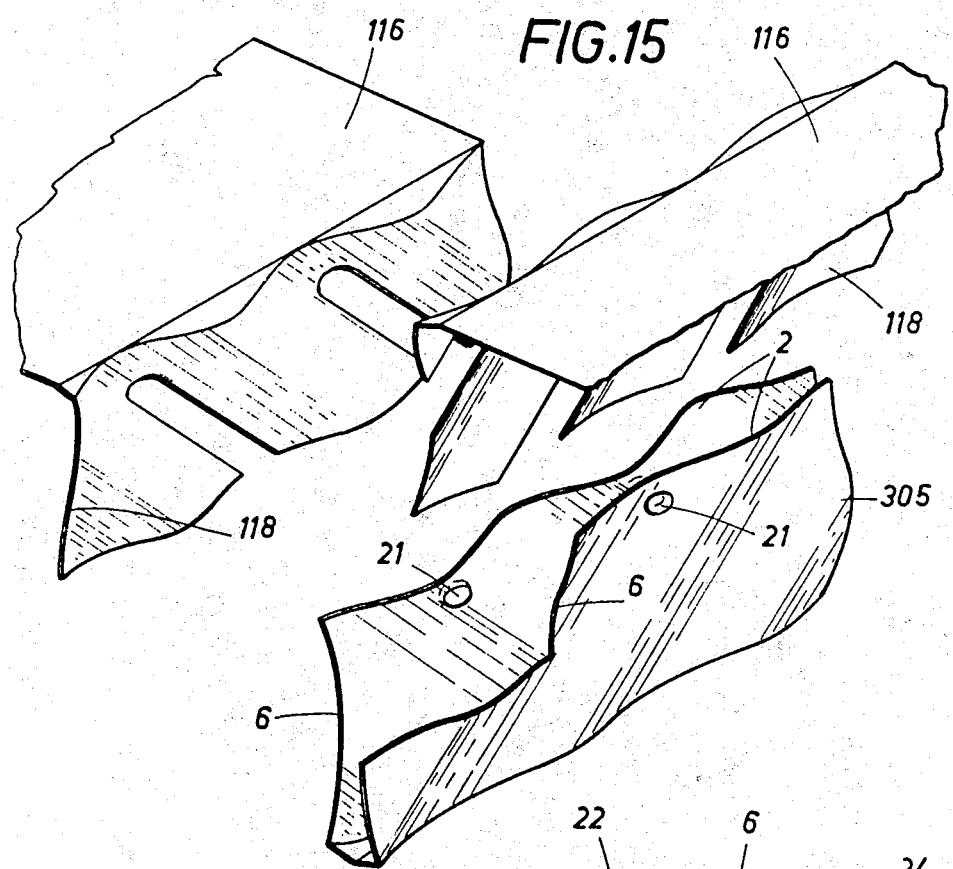
FIG. 15 is a perspective view showing a joint which is suitable for several structural elements.

According to FIG. 15, the corrugated flange surfaces 6 of a channel 305 are provided with integral bosses 21. The channel permits the insertion of the angularly offset edge portions 118 of sheet elements 116. The edge strips 118 have a corrugation which corresponds to the surfaces 6 and have inclined slots which receive the slots 21. Correspondingly shaped edge strips of additional structural elements may be inserted into the channel 305 and a strong joint is obtained when the remaining interspaces are provided with an initially fluid connecting compound or with bars.

Figure 16:
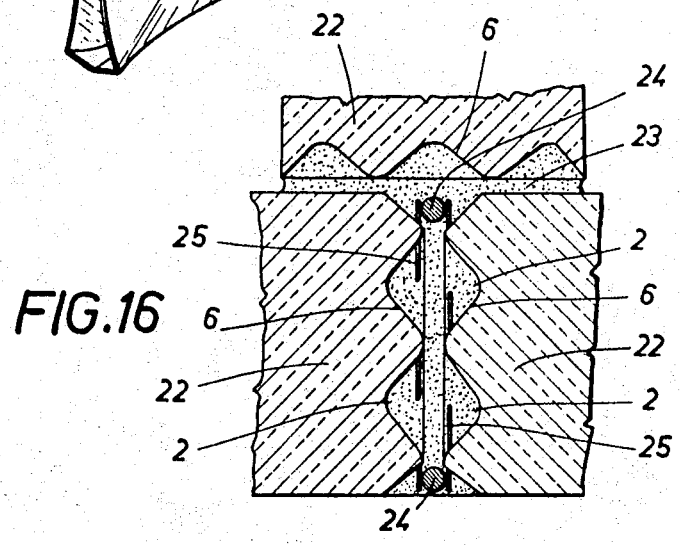
FIG. 16 is a transverse sectional view showing a joint between elements similar to building blocks.

As shown in FIG. 16, the end faces of building blocks 22 are corrugated to form surfaces 6. The entire space between these surfaces is filled with an initially fluid connecting compound. The blocks are fixed to each other even if the compound does not adhere to them. Diagonal strips in the recesses 2 are welded to a reinforcement 24 disposed in the joint. The device shown in FIG. 16 might be used for joining floor blocks and for a connection to the blocks of a wall erected on the floor.

Figure 17:
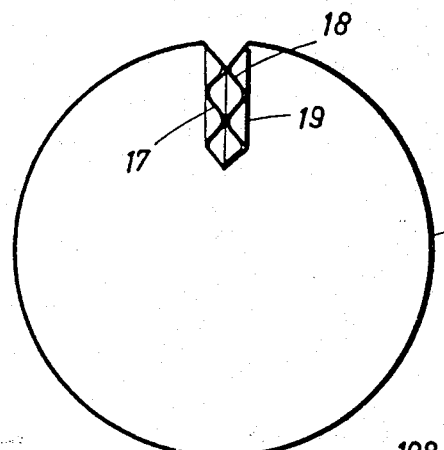
FIGS. 17 to 19 are transverse sectional views showing modified structural elements.

According to FIG. 17, a platelike structural element 216 has at one edge a corrugated strip 17 which forms a deep channel with a flat strip section 19 and at the other edge a cooperating, corrugated strip 18. The element 216 is bent to form a cylindrical tube, and the edge strip 18 is fitted into the channel in the manner shown in FIG. 11 so that a tube is locked. The joint is made inseparable by means of a non-illustrated initially fluid compound. In the same way, slender tapered structural elements can be made, which may be fitted together to form poles or the like.

Figure 18:
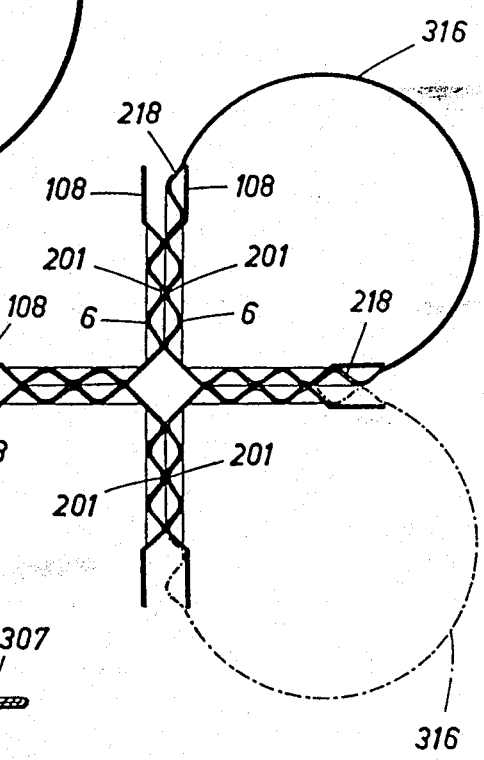

FIG. 18 shows a beam having a cruciform cross-section. Each arm of the cross consists of portions of two suitably bent strip members 201, which have corrugated surfaces 6 and are connected by spot welds at the points of contact. The corrugated portion is adjoined by plane edge strips 108. The corrugated edges 218 of curved plates 316 are inserted into the groove formed by the edge strips 108 and are connected to the beam by non-illustrated bars 15 or 115, such as are shown in FIG. 9.

Figure 19:
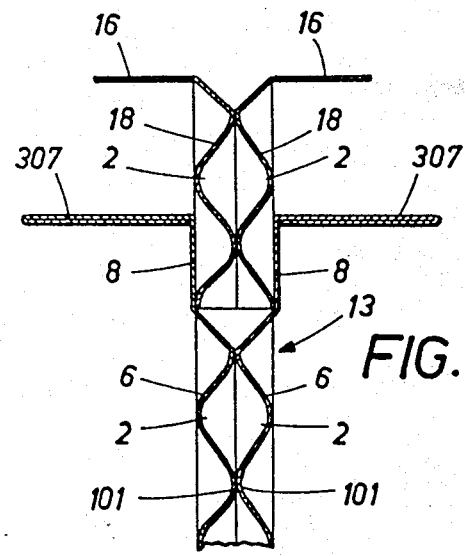

FIG. 19 shows a portion of a beam 13 according to FIG. 9. Suitably corrugated edge strips 18 of plates 16 are inserted into the groove defined by the flat strips 8 at the edge of the surfaces 6. The plates 16 cover the internal cavity of the beam and may be connected to the beam 13 with the aid of bars 15.

What is claimed is:
1. A structure comprising, in combination
    (a) two elements having respective faces opposite each other, and defining a space therebetween, each of said faces being formed with a plurality of grooves elongated in a common direction and constituting respective portions of said space, the grooves in one face being angularly offset from the grooves in the other face, the grooves in the respective faces crossing each other;
    (b) two elongated locking bars, each bar having a first longitudinal portion received in a groove of a respective one of said elements and a second portion projecting from said groove, said projecting portions being elongated in a common direction and contiguously juxtaposed in a direction transverse of the direction of elongation thereof;
    (c) holding means fixedly securing said juxtaposed projecting portions to each other; and
    (d) retaining means preventing movement of said faces away from each other.
2. A structure as set forth in claim 1, in which said holding means comprise a sleeve fitted over said juxtaposed projecting portions.
3. A structure as set forth in claim 1, in which said juxtaposed projecting portions are formed with respective portions of a screw thread and said holding means include a nut in threaded engagement with said screw thread.
4. A structural joint comprising a beam and another structural element, said beam including two elongated strip members having respective, opposite, elongated surfaces constituting a first pair of surfaces, each surface being formed with a plurality of elongated, substantially parallel grooves obliquely inclined relative to the direction of elongation of the respective surface, the grooves in each surface of said first pair crossing the grooves in the other surface of said first pair, said other structural element including two members having respective opposite surfaces constituting a second pair of surfaces, each surface of said second pair being formed with a plurality of elongated, substantially parallel grooves, the grooves in each surface of said second pair crossing the grooves in the other surface of said second pair, retaining means holding the surfaces of each pair of surfaces in contact with each other; and locking means fitting said grooves in said strip members of the beam and in said other structural element for connecting said structural element to said beam.
5. A joint as set forth in claim 4, wherein said retaining means include a plurality of spot welds.
6. A structural joint as set forth in claim 4, in which said beam is horizontal and said structural element is vertical.
7. A structural joint as set forth in claim 4, in which said structural element depends from said beam.

References Cited by the Examiner
UNITED STATES PATENTS

| | | | |
|---|---|---|---|
| 2,522,097 | 9/1950 | Cookson | 189—36 |
| 3,137,900 | 6/1964 | Carbary | 20—35 X |

FOREIGN PATENTS 851,905   10/1952   Germany.

HARRISON R. MOSELEY, *Primary Examiner.*

P. M. CAUN, *Assistant Examiner.*